Oct. 15, 1946.  H. F. KURTZ ET AL  2,409,364
OPTICAL INSTRUMENT
Filed Oct. 13, 1943

HENRY F. KURTZ
ROBERT G. MORRISON
INVENTOR
BY
ATTORNEYS

Patented Oct. 15, 1946

2,409,364

UNITED STATES PATENT OFFICE 2,409,364

OPTICAL INSTRUMENT

Henry F. Kurtz, Rochester, and Robert G. Morrison, Greece, N. Y., assignors to Bausch & Lomb Optical Company, Rochester, N. Y., a corporation of New York Application October 13, 1943, Serial No. 506,076

8 Claims. (Cl. 88—34)

This invention relates to optical instruments, such as telescopes, and more particularly to binocular telescopes. This application is a continuation-in-part of our co-pending application Serial No. 456,238 filed August 26, 1942.

In binoculars heretofore proposed, the eyepiece or ocular tube has been carried by a mounting tube usually threaded into the end wall or a detachable cap forming an end wall of the body of the instrument. In the instrument of the present invention, the mounting tube is made integral with a detachable cap forming the end wall of the same and the threaded joint on the exterior surface of the instrument is thus eliminated.

The ocular tube is telescopically mounted within the mounting tube and the axis of the ocular tube is held coincident with the axis of the mounting tube through guide surfaces formed on the exterior of the ocular tube and the interior of the mounting tube. The guide surfaces not only hold the axis of the ocular tube coincident with the axis of the mounting tube during the axial movement of the ocular but also tend to seal the telescopic connection between the two tubes.

As the mounting tube actually carries and is used to position the optical elements of the ocular relative to the body, means are provided for locating the cap relative to a uniplanar surface establishing a reference plane used to locate and mount the optical elements of the instrument. To this end, the cap is formed with a uniplanar surface held normal to the axis of the mounting tube and adapted to engage the surface of the body defining the reference plane. In the embodiment of the invention now preferred, this surface is formed on a shoulder of the body adjacent the end closed by the cap and the engaging surface of the cap is formed on the end face of a flange adapted to circumscribe the open end of the body. As the axis of the mounting tube is normal to the plane of the end face of the flange, the axis of the tubular member and consequently the axis of the ocular will be normal to the reference plane when the cap is mounted to the body.

To locate the axis of the ocular in a predetermined desired position, a locating surface is formed on the wall of the body of the instrument and is engaged by a cooperating surface formed on the mounting tube when the cap is secured to the body. The locating surface is so formed relative to the reference plane that the axis of the mounting tube will be located and held in a predetermined desired position merely by the assembly of the cap to the body. Thus the alignment of the optical axis of the eyepiece with the axis of the other optical elements of the instrument is not left to the skill of the workman but is reduced to a simple assembly operation easily completed by the ordinary worker.

To seal the jointure between the cap and body, a gasket is placed on the end face of the body and compressed when the surface on the flange of the cap is brought into close engagement with the uniplanar surface of the body. In previously proposed binoculars, where the end surface of the body has been used as the reference plane, care had to be taken that the gasket was of constant thickness and that it was evenly compressed over its entirety, for otherwise the cap would not be disposed in the desired angular position relative to the optical axis of the objective.

At the objective, the line of jointure between all surfaces of the objective mounting are sealed by means of a gasket held in place by a locking ring which locks the objective in position. This ring, in the now preferred form of the present invention, is held against movement by a guard cap secured to the body of the instrument, which further seals the body against entrance of moisture.

Other features and advantages of the present invention will be apparent from the following description taken in conjunction with the accompanying drawing, in which.

Figure 1:
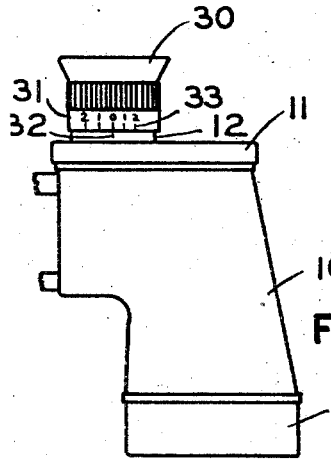
Fig. 1 is an elevational view of one body unit of the binocular illustrative of the present invention.
Figure 3:
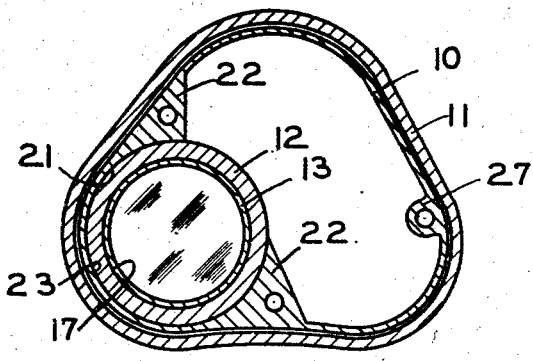
Fig. 3 is a section taken along line 3—3 of Fig. 2.
Figure 2:
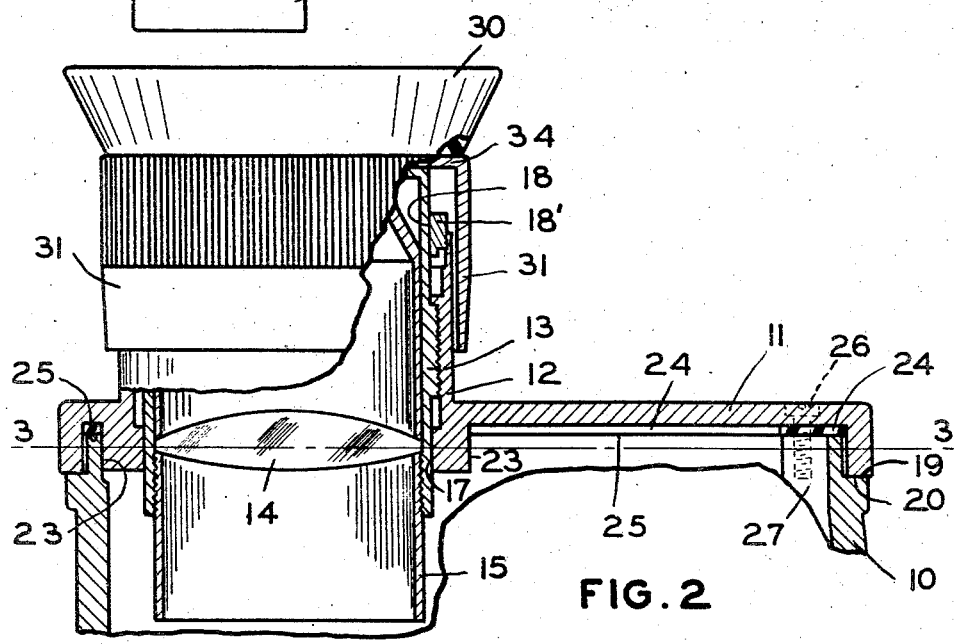
Fig. 2 is a sectional view partly in elevation of the upper end of the binocular.
Figure 4:
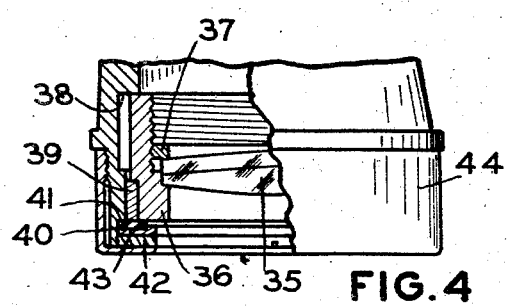
Fig. 4 is a view similar to Fig. 2 but showing the objective end of the binocular.

As both body units of the instrument of the present invention are identical, only one unit has been illustrated although it is to be understood that the instrument comprises two body units which, if desired, may be pivotally secured together to allow the units to be adjusted so that the eyepieces may be spaced apart the necessary pupillary distance to meet the requirements of a particular user.

In the now preferred form of the present invention, the body is preferably molded with the opposite ends open to permit the prism elements to be more easily assembled therewith. The one end of the body 10 is closed by a cap 11 having integrally formed therewith a mounting tube 12 normally projecting outwardly on opposite sides thereof. The interior surface of the outer portion of the tube 12 is threaded and takes a threaded ocular tube 13 carrying eyepiece lens elements, one of which is indicated at 14 and shown locked in position within the same by a threaded band 15. The eyepiece elements are accurately mounted within the tube 13 with the optical axes thereof coincident with the axis of the tube.

To align the axis of the ocular tube 13 with that of the mounting tube 12, an accurately formed cylindrical surface 17 is machined on the interior of the tube 12 and this surface, together with a cylindrical surface 18 concentric therewith and formed on the interior of a ring 18' threaded into the opposite end of the tube 12, engages spaced portions of the exterior surface of the ocular tube 13 and holds the same in the desired position relative to the mounting tube 12. The annular passage between the two tubes is very effectively sealed due to the threaded connection and the close engagement between the exterior surface of the tube 13 and the spaced bearing surfaces 17 and 18.

In the assembly operation, the ocular tube is merely threaded into the mounting tube and as the two surfaces 17 and 18 will align and hold in alignment the assembled tubes, the step of aligning the ocular tube with the mounting tube is reduced to a simple assembly operation easily completed by the ordinary workman.

Furthermore, in prior devices, where the mounting tube was threaded into the body, small chips, cut by the meshing threads as the tube and body were assembled, dropped into the body and if not removed tended to foul the surfaces of the optical elements of the body.

After the ocular tube 13 has been assembled with the mounting tube 12, the cap can then be secured to the body 10 of the instrument. As the mounting tube 13 actually carries and is used to align the eyepiece of the instrument relative to the same, it is important that the cap be so mounted to the body that the axis of the mounting tube will be located in a predetermined position relative to the optical axis of the other elements carried by the body, for unless this is so, the optical axis of the eyepiece will not be in proper alignment with the optical axis of the other elements.

To insure that the axis of the mounting tube 12 will be in the desired position after the cap is assembled to the body, the body is formed with a shoulder adjacent the end enclosed by the cap and the face 19 of the shoulder is accurately machined uniplanar. In the preferred form of the present invention, the face 19 is used to establish a reference plane for mounting and locating the optical elements of the instrument. The cap is formed with a depending flange and the end face 20 of the flange is machined uniplanar, and is adapted to engage the surface 19 when the cap is mounted on the body. The plane of the face 20 is maintained normal to the axis of the mounting tube 12 so that when the cap is mounted to the body with the surfaces 19 and 20 in facewise engagement, the axis of the tubular member, and consequently the axis of the ocular, will be normal to the reference plane established by the surface 19.

Furthermore, it will be obvious that the flange, if held to a predetermined length, will space the elements of the ocular tube the proper predetermined distance from the reference plane established by the face 19.

To locate the axis of the ocular in a predetermined desired position, a locating surface is formed on the mounting tube 12 which, when brought into engagement with a correlated surface on the body, fixes the axis of the mounting tube in the desired position. As the ocular tube will have already been positioned in the mounting tube, the assembly of the body and cap brings the optical axis of the ocular tube into the desired relationship with the reference plane determined by the surface 19. Although the locating surfaces may be formed in any manner desired, it is now preferred to form the same cylindrical and, in the illustrated embodiment of the invention, the one surface 21 is formed on the adjacent faces of the blocks 22 cast integral with the wall of the body 10 and the inner portion of the wall of the body intermediate the blocks. The axis of the surface 21 is normal to the plane of the surface 20 and forms a relatively large locating surface cooperating with a similar machined surface 23, formed on the exterior of the lower portion of the tube 12. Thus, when the cap is placed in position on the body 10 with the two surfaces 21 and 23 in engagement, the axis of the tube 13, and consequently the optical axis of the eyepiece, will not only be held normal to the reference plane but will be also located in the desired position relative to the same.

To seal the body at the end closed by the cap 11, a gasket 24 is seated on the end face 25 of the body 10 and is clamped against the same by the cap 11 as the latter is drawn up against the body by screws 26 received in tapped holes formed in the blocks 22 and a boss 27 integrally formed with the body during its forming operation. The gasket has a greater thickness than the distance between the end face of the body member and the inner surface of the cap after the uniplanar surfaces of the body and cap are in facewise engagement so that the the gasket is compressed after the cap is mounted to the body. In previously proposed binoculars where the end face of the body has been used as the reference method, care had to be taken that the gasket was of constant thickness and that it was evenly compressed over its entirety, for otherwise the cap would not be disposed in the desired angular position relative to the optical axis. It will be obvious that this difficulty has been obviated by the construction of the present invention.

The tube 13 carries an eyecup 30 and a diopter band 31 which telescopes the upper portion of the tube 12. The tube 12 is marked with an index line 32 cooperating with the usual graduations 33 of the diopter band. The diopter band rotates with the tube 13 during the adjustment thereof longitudinally of the tube 12 and will indicate to the user the particular setting of the eyepiece in diopters.

In the now preferred embodiment of the device of the present invention, the ring 18' forms a stop collar for limiting movement of the ocular tube 13 and will prevent the same from being threaded out of the tube 12. The ring in one limit of adjustment limits the movement of the tube 13 by engaging the exterior threads thereof, and in the other limit, the underneath surface of the flange 34 of the diopter band 31.

The objective 35 of the binocular of the present invention is carried by a cell 36 and held in place on the cell 36 by a bezel ring 37. The cell 36 engages an annular seat 38 formed within the open end of the body 10 and spaced a predetermined distance from the surface 19. The optical axis of the objective is laterally adjustable by means of the conventional eccentric ring 39 mounted within the open end of the body.

To hold the cell 36 in the proper adjusted position and to seal this end of the body against entry of moisture, a gasket 40 of some compressible material, such as rubber or the like, is clamped against the seat formed by a shoulder 41 adjacent the open end of the body 10 and the exposed faces of the eccentric ring 39 and cell 36.

The gasket 40 is clamped against the seat formed by means of a ring 42 threaded into the open end of the body 10 against a metallic washer 43 in facewise engagement with the gasket 40. As the gasket 40 is of a width sufficient to cover the joints between the cell 36 and the eccentric ring 39 and the eccentric ring 39 and the interior surface of the wall of the body 10, these joints are effectively sealed against the entry of moisture.

A cap 44 is threaded over the end of the body 10 and holds the locking ring 42 against movement and further seals this end of the body against the entry of moisture. The exposed surfaces of the cap, if desired, may be given some decorative configurations.

It has been shown that the assembly operation for assembling the ocular tube with the mounting tube as well as the assembly operation for assembling the cap with the body has been so simplified that these operations may be formed by relatively unskilled workmen. This reduces the assembly cost of the instrument which results in a considerable saving in the cost of the instrument, for heretofore the assembly costs have constituted a relatively large part of the cost of the finished instrument. As the finished article is very effectively sealed against moisture, the efficiency of the instrument is not only increased but its life is prolonged as well.

While one embodiment of the invention has been disclosed, it is understood that the invention need not be limited to the device as described, but is susceptible of modifications falling within the spirit of the invention and the scope of the appended claims.

We claim:

1. In a device of the type described, a body; a uniplanar surface thereon defining a reference plane; a cap for closing one end of said body; a tubular member formed integral with the cap; means carried by said tubular member, a surface on the body, said means and surface cooperating for positioning the axis of said tubular member in a predetermined position relative to said reference plane when the cap is mounted to said body; an ocular tube telescopically received by said tubular member for movement axially thereof; means for holding the axis of said ocular tube coincident with the axis of said tubular member; means for sealing the telescopic connection between the relatively movable tubular member and ocular tube; means carried by said cap and cooperative with said uniplanar surface for locating said tubular member a predetermined distance from said reference plane; and means for sealing the jointure between said cap and body.

2. In a device of the type described, a body; a cap for closing one end of said body; a tubular member formed integral with the cap and extending on opposite sides thereof; means carried by said tubular member and cooperative with means carried by said body for positioning said cap on the body with the axis of said tubular member in a predetermined position; an ocular tube telescopically received by said tubular member for movement axially thereof; means for limiting movement of said tube relative to said tubular member; means at opposite ends of said tubular member for guiding movement of said ocular tube whereby the axis of said tube is maintained coincident with the axis of said tubular member, said means sealing the telescopic connection between said tube and tubular member; and means for sealing the jointure between said cap and body.

3. In a binocular a body housing, at least one optical element having a fixed optical axis; a cap for closing one end of the body; a tubular member formed integral with the cap and extending on opposite sides thereof; an ocular tube telescopically received within said tubular member, said ocular tube carrying at least one lens, the optical axis of said lens being coincident with the axis of said tube; a surface on said tubular member cooperative with a surface on said body when the cap is moved to body closing position for locating said cap on the body with the axis of said tubular member in a predetermined position relative to the optical axis of said element; means carried by said tubular member at opposite ends thereof for engaging and holding said ocular tube with the axis thereof coincident with the axis of the tubular member, said means including means for sealing the telescopic union between said tubular member and the ocular tube; and means for sealing the jointure between said cap and body.

4. In a device of the type described, a body; a uniplanar surface on said body forming a reference plane; a cap for closing one end of said body; a tubular member formed integral with the cap and extending on opposite sides thereof; means carried by said tubular member and cooperative means carried by said body for positioning said cap on the body with the axis of said tubular member in a predetermined position relative to said reference plane; an ocular tube telescopically received by said tubular member for movement axially thereof; means comprising spaced aligned cylindrical bearing surfaces having diameters substantially equal to the diameter of said ocular tube and disposed at opposite ends of said tubular member for holding said ocular tube concentric with said tubular member, said means including means for sealing the telescopic connection between said tubular member and ocular tube; and means for sealing the jointure between said cap and body.

5. In a device of the type described, a body; a cap for closing one end of said body; a tubular member formed integral with the cap and extending on opposite sides thereof; means carried by said tubular member and cooperative with means carried by said body for positioning said cap on the body with the axis of said tubular member in a predetermined position; an ocular tube telescopically received by said tubular member for movement axially thereof; a collar carried by said tubular member for limiting movement of said ocular tube; means including means on said collar for holding said ocular tube concentric with said first-named tubular member and for sealing the telescopic connection between the tubular member and said ocular tube; and means for sealing the jointure between said cap and body.

6. In an instrument of the type described, a body having an open end; an exterior shoulder formed on said body adjacent said open end, said shoulder comprising a uniplanar surface forming a reference plane; a flanged cap for closing said open end; a tubular member formed integral with said cap; a uniplanar surface on the flange of said cap adapted to engage the uniplanar surface of said body when said cap is mounted thereon for holding the axis of said tubular member normal to said reference plane; a locating surface carried by said tubular member; and a locating surface formed on said body and adapted to engage the locating surface of said tubular member for holding the axis of said tubular member in a predetermined position relative to a predetermined axis normal to said plane.

7. In an instrument of the type described, a body having an open end; an exterior shoulder formed on said body adjacent said open end, said shoulder comprising a uniplanar surface forming a reference plane; a cap for closing said open end; a depending flange carried by said cap; a tubular member formed integral with said cap; a uniplanar surface on the flange of said cap adapted to engage the uniplanar surface of said body when said cap is mounted thereon for holding the axis of said tubular member normal to said reference plane; a locating surface carried by said tubular member; a locating surface formed on said body and adapted to engage the locating surface of said tubular member for holding the axis of said tubular member in a predetermined position relative to a predetermined axis normal to said plane; and a gasket of compressible material carried by the end face of said body, said gasket being compressed when said cap is secured to said body with the uniplanar surfaces in facewise engagement.

8. In an instrument of the type described, a body having an open end; a shoulder formed on said body adjacent said open end, said shoulder comprising a uniplanar surface forming a reference plane; a cap for closing said open end; a tubular member formed integral with said cap; a flange on said cap adapted to circumscribe said body adjacent the open end thereof; a uniplanar surface on said flange adapted to engage the uniplanar surface of said body when the cap is secured thereto for holding the axis of said tubular member in a predetermined angular position relative to said reference plane; and a gasket of compressible material carried by the end wall of said body, said gasket having a thickness greater than the distance between said end wall of the body and the interior surface of the cap so that said gasket is compressed when the cap is secured to said body and the uniplanar surfaces are in facewise engagement.

HENRY F. KURTZ.
ROBERT G. MORRISON.